M. B. HOUGH.
Churn.
No. 1,072.
Patented Jan'y 21, 1839.
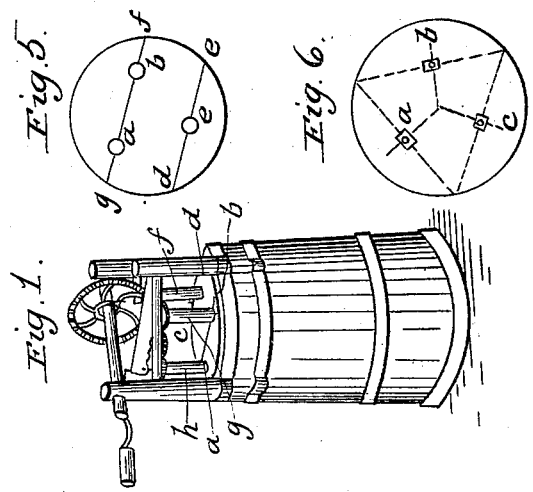
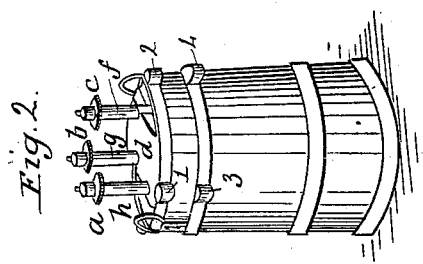
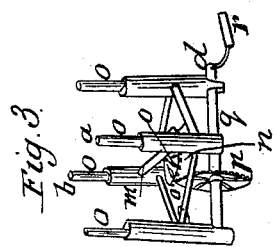
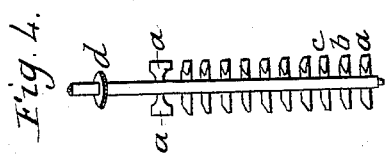
Witnesses.
Wells Ports
Asa Blood
Inventor:
Milo B. Hough

UNITED STATES PATENT OFFICE.

MILO B. HOUGH, OF DOVER, OHIO.

CHURN FOR MAKING BUTTER.

Specification of Letters Patent No. 1,072, dated January 21, 1839.

*To all whom it may concern:*

Be it known that I, MILO B. HOUGH, of Dover, in the county of Cuyahoga and State of Ohio, have invented a new and improved Mode of Churning or Procuring Butter from Milk or Cream; and I do hereby declare that the following is an exact and full description.

The nature of my invention consists in providing the common round churn with three or more standards or upright shafts which are placed inside the churn and these shafts all supplied with paddles or beaters for the purpose of separating or acting on the milk or cream, those shafts being driven by wheels as hereinafter described.

To enable others skilled in the art to make and use by invention I will proceed to describe its construction and operation.

I construct the body of my churn in any of the known forms of making churns (generally round) and any size I please. About fourteen inches for the diameter at the bottom is a good size and twelve inches for the top and twenty six inches for the length of the staves. I then divide the circumference of the bottom into three equal parts, which forms an equilateral triangle. I then find the center of its sides, at which I place the boxes in which the feet of the shafts stand. I make the boxes of lead or zinc.

Figure 6 shows the method of laying out the bottom, and $a$, $b$, $c$, Fig. 6, shows the manner of placing the boxes when three shafts are used.

Fig. 5 shows the lid of the churn. $a$, $b$, $c$ shows the holes for the shafts to pass through $d$, $e$, and $f$ and $g$, Fig. 5 shows the joints in the lid abutting at the center of the shafts to admit the lid being taken out at pleasure.

Fig. 4 shows one of the three shafts. I make them either round or square and about one and a half inches in diameter. I then with a three quarter inch bit bore holes through the shafts about two and a half inches from center to center until I get within eight inches of the end of the shaft. I then set off four inches from the center of the last hole and I make a mortise two inches long by three eighths of an inch wide. I put the ends of the fans as shown at $a$, $a$, and as long as will admit them to pass when set in the churn and not have their ends strike in revolving. I then supply the holes below the fans with beaters either round or square, with the opposite sides at each end scraped off, giving it a screw like form, as shown at $a$, $b$, $c$, Fig. 4. $a$, Fig. 4, shows one of the pinions which I make about two and a half inches in diameter of metal or wood which I place on the shafts within one and a half inches of the top.

Fig. 3 shows the frame which supports the two driving wheels $p$ and $o$. $m$ and $n$ show the two pieces which support the wheel O, which pieces run across the frame, each end of which rests on the posts $a$ and $b$, Fig. 3, which shows the frame inverted. $p$ shows the main driving wheel, which is a bevel wheel and may be made ten inches in diameter, and which I place on the shaft $q$, which rests in the ends of the posts of the frame marked $c$ and $d$. O is a double tooth wheel the upper set of teeth are bevel 4 inches in diameter, which wheel $p$ meshes into and the under set of teeth are spur $5\frac{1}{4}$ inches in diameter which meshes into $a$, $b$, $c$, the pinions Fig. 2. Fig. 3, $r$ shows the crank and handle. $p$ meshes into O, Fig. 3, and O, Fig. 3, meshes into $a$, $b$, $c$, Fig. 2, when in operation.

Fig. 2 shows the churn with the frame, Fig. 3, taken off. $f$, $g$, $h$ show the ends of the shafts, one of which is shown at Fig. 4. 1, 2, 3, 4 show the loop holes in the hoops of the churn in which the feet of the frame, Fig. 2, $o$, $o$, $o$, $o$, sets in to keep the frame steady when in operation. $d$, Fig. 2, shows the center pins of the lid as shown also at Fig. 5.

Fig. 1 shows the parts put together for use; $h$, $g$, $f$, the shafts; $a$, $b$, $c$, $d$ the joints in the lid, as shown also at $f$, $g$, and $d$, $e$, Fig. 5.

What I claim as my invention and desire to secure by Letters Patent is—

The combination of the fans on the upper end of the shafts with the beaters, in the manner and for the purpose before described.

MILO B. HOUGH.

Witnesses:
WELLS PORTER,
ASA BLOOD.